(12) United States Patent
Vollmer (10) Patent No.: US 6,669,307 B1
(45) Date of Patent: Dec. 30, 2003

(54) PARKING AND MANEUVERING VALVE FOR TRAILERS HAVING A SPRING-LOADED PARKING BRAKE

(75) Inventor: Otto Vollmer, Munich (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 09/856,373

(22) PCT Filed: Oct. 25, 1999

(86) PCT No.: PCT/EP99/08060

§ 371 (c)(1),
(2), (4) Date: Sep. 4, 2001

(87) PCT Pub. No.: WO00/30912

PCT Pub. Date: Jun. 2, 2000

(30) Foreign Application Priority Data

Nov. 20, 1998 (DE) .......................... 198 53 718

(51) Int. Cl.⁷ .............................. B60T 13/00
(52) U.S. Cl. .................................. 303/9.66
(58) Field of Search .................. 303/9, 9.65, 9.66, 303/30, 36, 37, 80

(56) References Cited

U.S. PATENT DOCUMENTS

| 4,080,004 A | 3/1978 | Ury | |
| 4,088,374 A | * 5/1978 | Gute | 303/9 |
| 4,232,908 A | * 11/1980 | Stearns | 303/9 |
| 4,877,294 A | * 10/1989 | Kuhn et al. | 303/9 |

FOREIGN PATENT DOCUMENTS

| DE | 21 35 924 | | 1/1973 |
| DE | 27 20 632 | | 12/1977 |
| DE | 19818982 A1 | * | 11/1999 |
| EP | 0 544 104 | | 6/1993 |
| EP | 0 792 783 | | 9/1997 |
| GB | 1534253 | * | 11/1978 |
| GB | 1 572 439 | | 7/1980 |

* cited by examiner

Primary Examiner—Christopher P. Schwartz
Assistant Examiner—Xuan Lan Nguyen
(74) Attorney, Agent, or Firm—Crowell & Moring LLP (57) ABSTRACT

The invention relates to a parking and maneuvering valve for trailers having a spring-loaded parking brake. The aim of the invention is to produce a braking system without a trailer braking valve. The invention provides a release unit, a parking unit and an emergency brake unit functionally assigned to the two units. The release unit, parking unit and emergency brake unit are interactively connected so that the parking unit convoys the pressure exerted by the reservoir of the trailer by the emergency brake unit or conveys the pressure exerted by the coupling head "reservoir" by the emergency brake unit to the spring-loaded parking brake system.

18 Claims, 5 Drawing Sheets

PARKING AND MANEUVERING VALVE FOR TRAILERS HAVING A SPRING-LOADED PARKING BRAKE

BACKGROUND AND SUMMARY OF THE INVENTION

The invention relates to a parking and maneuvering valve for trailers having a spring-loaded parking brake.

The design of the standard brake system for trailers is a prior art brake system that is equipped with a spring-loaded parking brake that is in general complicated and expensive. A trailer brake valve is used that is connected to a so-called combination release valve. In addition, there is a separate two way or shuttle valve that prevents stress on the mechanical brake due to additional force from the service brake member and the spring-loaded brake member on the trailer brake. This class of brake system is provided with two button control. That is, the combination release valve works with two actuating buttons. When the trailer is uncoupled and braked, the combination cylinder, which combines the diaphragm cylinder/spring-loaded cylinder of the service brake and parking brake, can be released by depressing both buttons and thus, the unbraked vehicle can be moved.

Given the above, the object of the invention is to simplify in such a manner the construction of trailer brake systems, equipped with a spring-loaded parking brake, that it retains the two button control and yet is inexpensive. In principle, it should be possible to put the trailer into park position both in the coupled and uncoupled state even if, as a consequence of short term or long term leakages, pressure losses in the compressed air supply of the trailer must be accepted.

This problem is solved with the features according to the claimed invention.

The simple construction of the valve unit, which eliminates the additional use of a trailer brake valve, is achieved through a combination of release unit, parking unit, and emergency brake unit. The emergency brake unit automatically reduces the speed of the trailer in the event of a break in the supply line, not by means of the service brake of the trailer, but by means of the spring-loaded brake system, a feature that constitutes a significant contribution to the functionality and reliability of the trailer brake system to the effect that during emergency braking no compressed air supply is necessary to operate the service brake and short or long term leakages in the compressed air supply of the trailer do not have any negative effect on the braking during standstill. The module, comprising release unit, parking unit and emergency brake unit, forming preferably a valve block, has universal application. It can also be retrofitted. If the two button control is kept, then previously recognized advantages of the control mode and possibilities can be retained.

Advantageous embodiments and improvements are described herein.

The invention is explained below by means of one embodiment with reference to the attached drawings.

DETAILED DESCRIPTION OF THE DRAWINGS

The parking and maneuvering valve for trailers with a spring-loaded parking brake system is assembled, as depicted in FIGS. 1 to 5, as a so-called combination valve, comprising a release unit 1, a parking unit 3, and an emergency brake unit 5.

The aforementioned components are connected so as to interact and serve to set the drive, park and maneuver positions of the trailer.

The release unit 1 exhibits a slider 7, which can be slid in a housing, with an actuating button 9. The release unit is connected by means of a line 11 to the coupling head "supply" 13, whereby the position-dependent lines 15 and 17 are monitored by means of the slider 7. The lines lead to the emergency brake unit 5 in the manner described below.

The parking unit 3 is in a comparable manner provided with a slider 21, which can be actuated by means of an actuating button 19 and which monitors lines 23 and 25, which lead to the emergency brake unit 5, and another line 27. The line 27 leads over a shuttle valve 29 and a line 31 to a spring-loaded brake member 33, which can form together with a service brake member 35 a combined service brake and spring-loaded brake cylinder 37, or is provided as a stand alone member.

Figure 1:
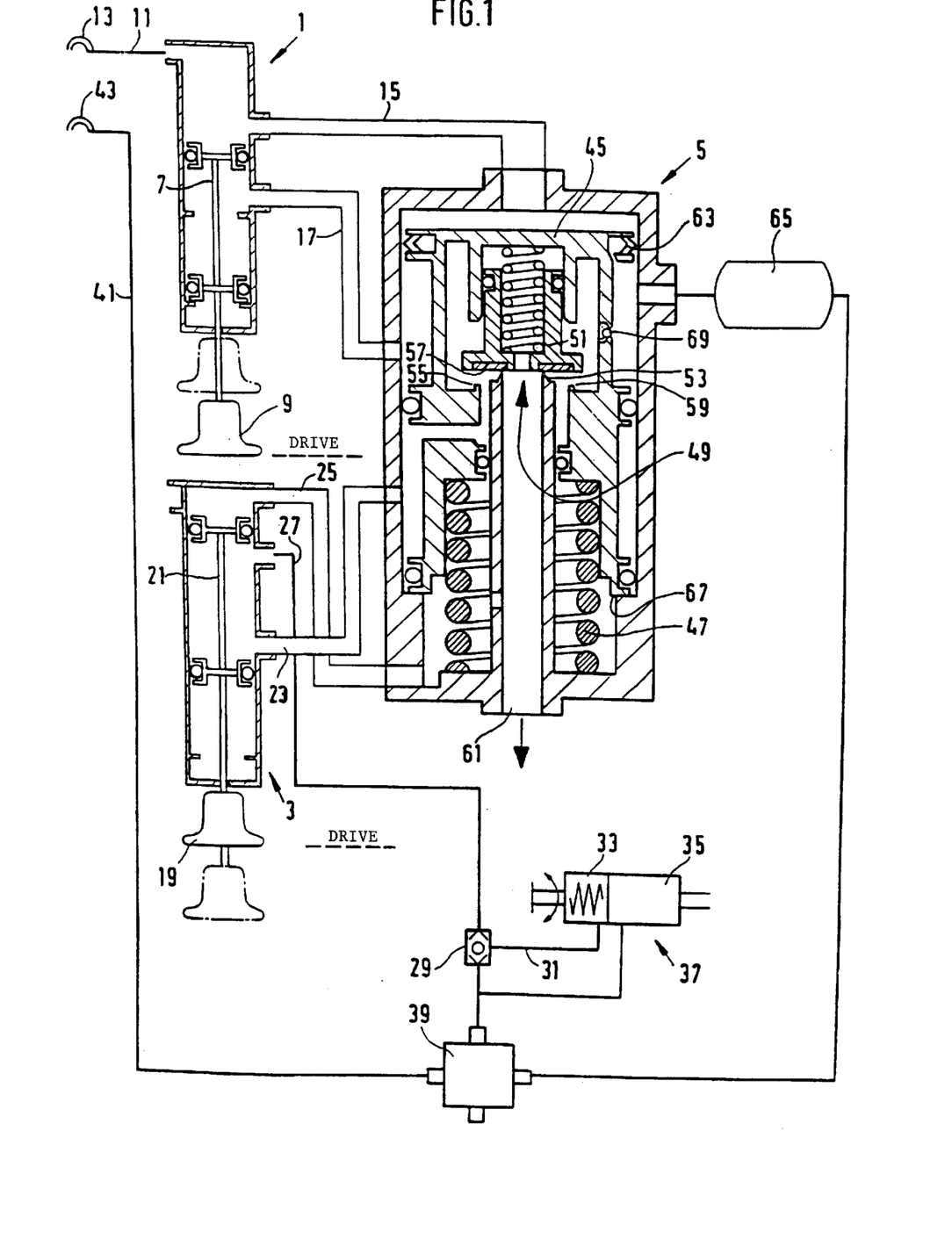
FIGS. 1 through 5 are individual sectional views, respectively, of the inventive valve block, comprising release unit, parking unit and emergency brake unit, in its circuit-related arrangement in a trailer brake system with spring-loaded parking brake.

An EBS module 39 (electronic brake system) can be attached, as shown in FIG. 1 of the drawings, to the combined service brake and spring-loaded brake cylinder 37, also called the combination cylinder. The EBS module 39 is attached by means of a line 41 to the coupling head "brake" 43 of the trailer. In the coupled trailer, the service brake of the combination cylinder is actuated or bled in a well-known manner by means of the coupling head "brake" 43 and the following EBS module 39 and by means of a line 41. The aforementioned shuttle valve 29 prevents the combination cylinder from overloading on the mechanical brake, since an overlapping of the forces of the spring-loaded brake member and the service brake member is ruled out. The shuttle valve 29 is not limited to the illustrated structural position. That is, it can also be integrated into the parking unit 3 in the attachment area of the line 27 or the EBS module 39.

Figure 3:
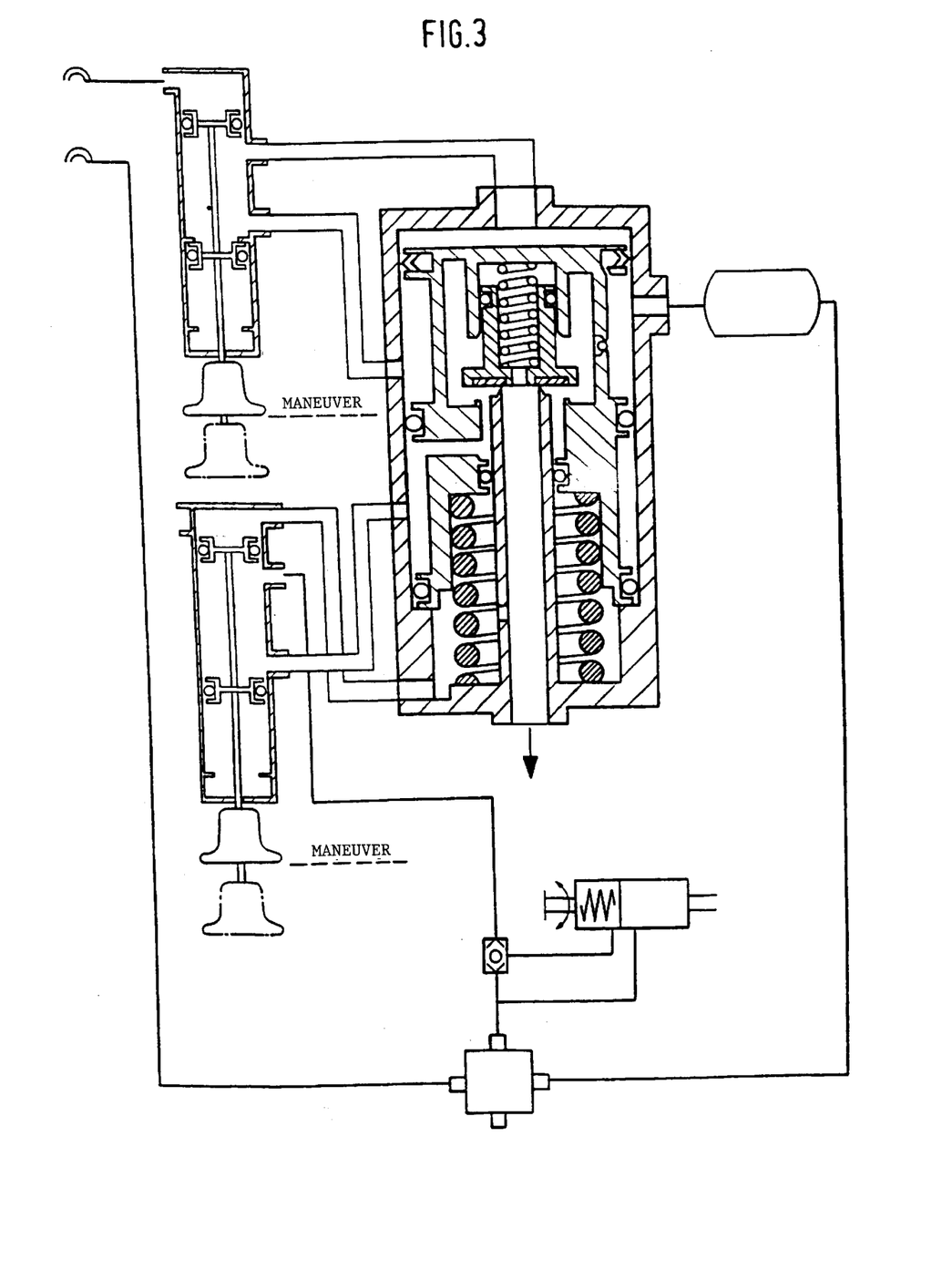

Inside the emergency brake unit 5 there is a piston 45, which is loaded over the line 15 by the supply pressure of the coupling head "supply" 13 in the drawing according to FIG. 1, and which is slid, as depicted in FIGS. 1, 3, 4 and 5, into its bottom functional position under pressure load against the force of a spring 47. In the interior of the piston 45 there is an inlet/outlet valve 49, which is formed by means of a valve body 51, which can be slid against spring force; a valve seat 53, which is stationary in the housing; and a valve seat 55, which moves with the piston. The valve seat 53, which is stationary in the housing, interacts with the valve body 51 as the outlet valve 57, whereas the valve seat 55, which can be moved with the piston, forms with the valve body 51 the inlet valve 59. The outlet valve 57 leads to an attachment 61, leading to the atmosphere, whereas in its open position the inlet valve is connected, as depicted in FIGS. 1 and 3, by means of the line connections to the spring-loaded brake member of the combination cylinder.

The function of the inventive parking and maneuvering valve, comprising the release unit 1, the parking unit 3, and the emergency brake unit 5, is described below with reference to the different function charts of FIGS. 1 to 5.

FIG. 1 depicts the operating state of the trailer in drive position, in which it is connected, thus coupled, to the towing vehicle. By means of the piston seal 63 of the piston 45, which is designed as the check valve, a supply tank 65, attached to the emergency brake unit 5, is supplied with compressed air from the towing vehicle by means of the coupling head "supply" 13. As a consequence of the pressure load, the piston 45 is in its bottom functional position, that is, in stop position at,a stop 67 of the valve housing of the emergency brake unit. The inlet valve 59 is opened according to the drawing. That is, compressed air flows from the supply tank 65, after passing a check valve 69, through the inlet valve 59 into the line 23, attached to the parking unit. The actuating button 19 is located, as depicted in FIG. 1, in its upper position of the drive position, so that the line 23 is connected to the line 27 and thus by way of the shuttle valve 29 to the spring-loaded brake member 33. Then the release chamber of the spring-loaded brake member of the combination cylinder is loaded with compressed air, thus the spring-loaded or parking brake is released. Since the line 41 is without pressure, the combination cylinder is altogether in release position. That is, the towing vehicle and the trailer are in drive position when the brake system is released.

Figure 2:
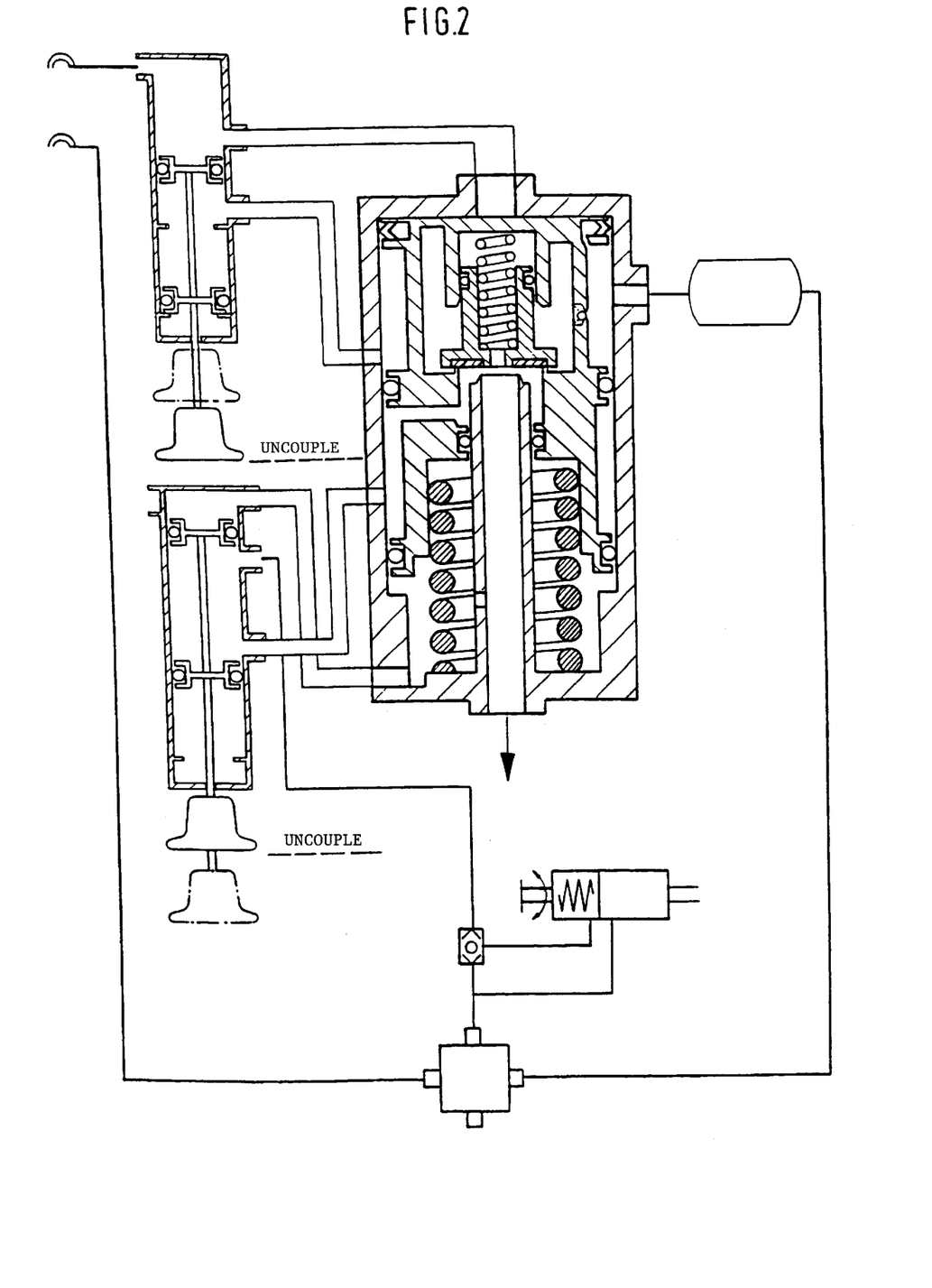

FIG. 2 of the drawings depicts the combination valve after uncoupling the trailer from the towing vehicle. The actuating buttons 9 and 19 remain in their positions. As a consequence of bleeding the line 15, the piston 45 returns into its upper stop position under the effect of the spring 47. In this position the inlet valve 59 is closed; and the outlet valve 57, which monitors the connection to the attachment 61, is opened. The aforementioned connection by way of the lines 27, 23 and the outlet valve is opened, thus bled, so that the spring-loaded or parking brake becomes effective. The line 41, connected to the coupling head "brake" 43 is also bled as a consequence of the uncoupling, thus preventing additional braking forces at the combination cylinder. In this operating state, the trailer is safely decelerated under the effect of the accumulator spring of the spring-loaded brake member. As a consequence, any leakage of the supply tank 65 has no effect.

The aforementioned operating state also takes place when in the coupled trailer there is a pressure loss in the supply line and a specific pressure of, for example, 2.5 bar, is exceeded. This state leads to an automatic reduction in speed of the trailer.

FIG. 3 of the drawings depicts the operating state "maneuvering" in the uncoupled trailer. To this end, the actuating button 9 of the slider 7 is slid to the top, whereas the actuating button 19 remains in its position, illustrated in FIGS. 1 and 2. In a pressureless line 11, the compressed air flows out of the supply tank 65, after passing the check valve 69, into the line 17, over the release unit 1 into the line 15 and drives the piston 45. As a consequence, said piston assumes the position, illustrated in FIG. 1 of the drawings. In this position there is a compressed air connection over the parking unit 3 to the spring-loaded brake member in such a manner that the accumulator spring is pressurized and the parking brake is released. In the uncoupled trailer, the line 41 is in turn without pressure so that the EBS module, feeding under relay effect the service brake member of the combination cylinder, is not activated. Thus, the combination cylinder is in its entirety released and the trailer can be moved, thus maneuvered.

If at this stage the trailer is connected to the towing vehicle, the position, which corresponds to the drive position and is depicted in FIG. 1, is automatically reversed. When the coupling head "supply" 13 is coupled to the corresponding coupling head of the towing vehicle, the slider 7 is pressurized. As a consequence, said slider is slid out of the position, shown in FIG. 3, in the downward direction to the position, shown in FIG. 1. That is, it is slid as far as the stop. The pressure conditions at the emergency brake unit 5 remain unchanged. That is, the piston 45, which was previously loaded over the line 17 and the line 15 with compressed air of the supply tank 65, remains in its illustrated position, because when moving the slider 7, the piston 45 is no longer pressurized as described above, but by means of the coupling head "supply" 13, as depicted in FIG. 1.

Figure 4:
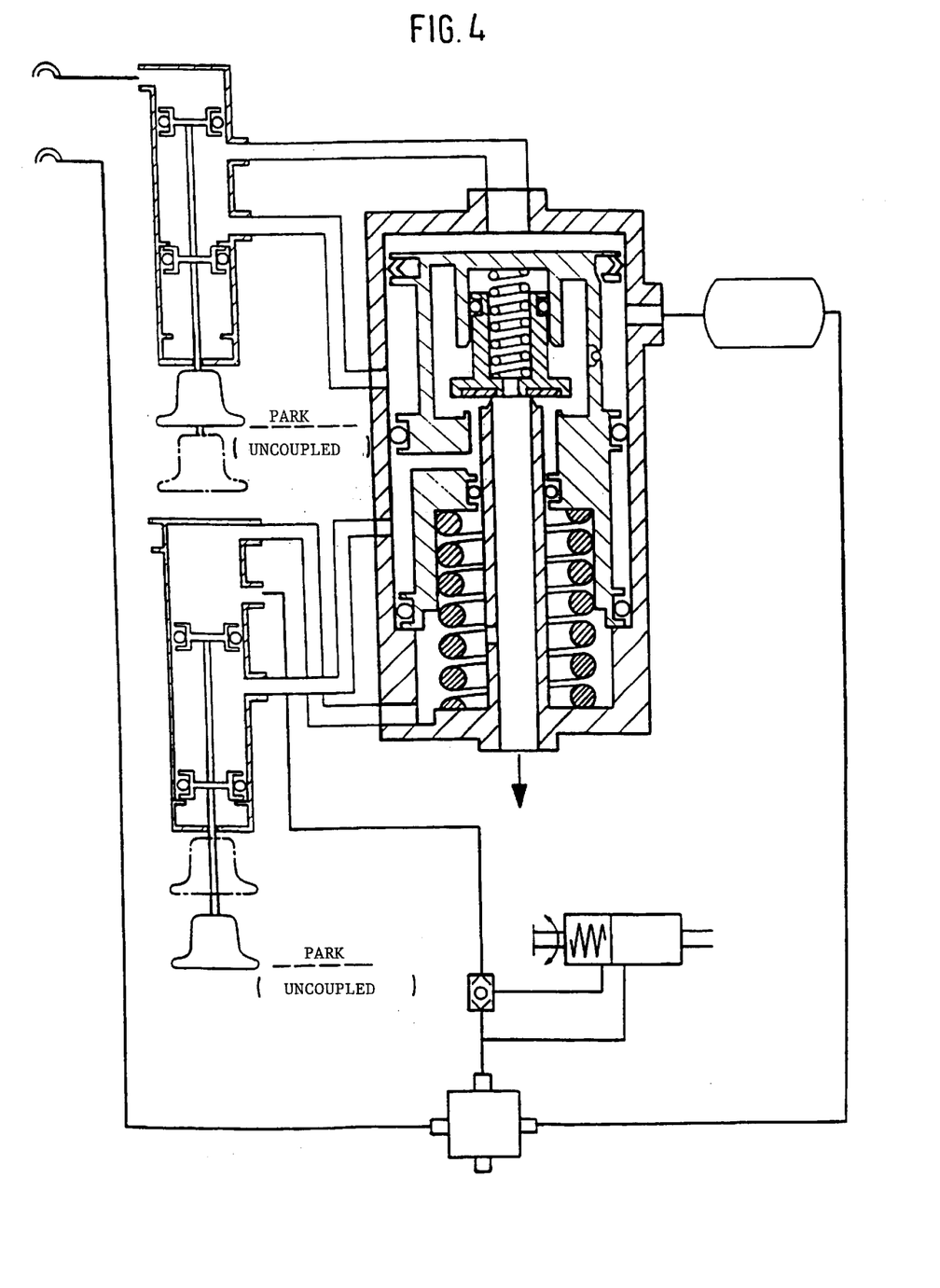
Figure 5:
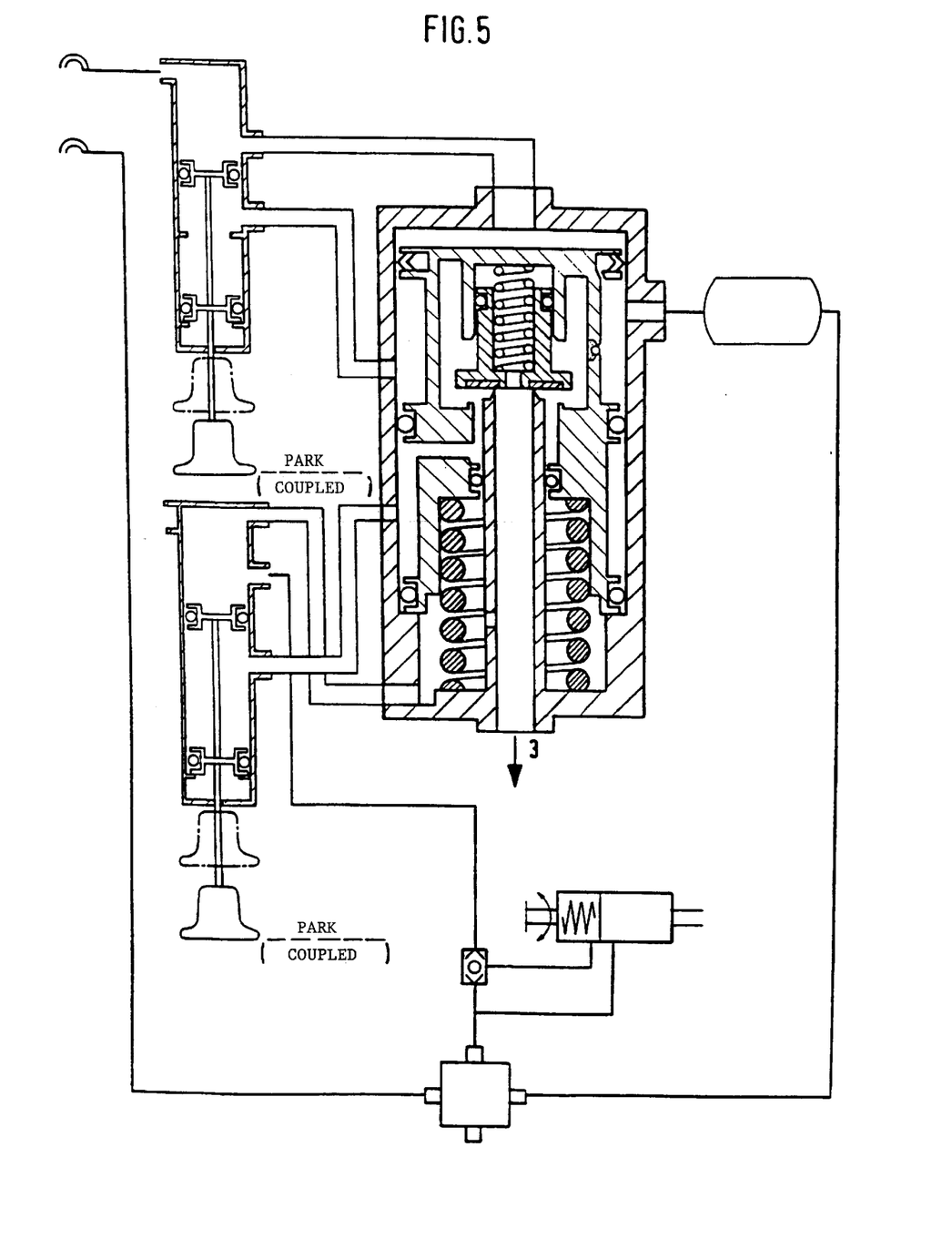

FIGS. 4 and 5 of the drawings depict the parking position of the trailer in the uncoupled state (FIG. 4) and in the coupled state (FIG. 5). In the position, depicted in FIG. 4, the actuating button 9 is located in the maneuvering position, explained with reference to FIG. 3, whereas the parking unit 3 is activated by actuating the actuating button 19, that is by moving the same into the parking position. As a consequence of this actuation of the parking unit, the line 27 and therefore the spring-loaded brake member 33 is bled over the shuttle valve 29 and line 31, whereby the line 27 is connected by way of the line 25 to the attachment 61, leading to the outside air. The spring-loaded brake member 33 is activated by means of bleeding. That is, the parking brake of the uncoupled trailer becomes effective.

It is possible to bleed the spring-loaded brake member 33, that is activate the parking brake, even in a trailer that is coupled to the towing vehicle, as illustrated by the positions in FIG. 5. In turn the actuating button 19 of the parking unit 3 is actuated, thus pulled out so as to point in the downward direction, so that the aforementioned bleeding of the spring-loaded brake member 33 occurs in the coupled state. Should the driver actuate at this point in time the service brake of the towing vehicle, a state that results in the activation, thus pressurization of the line 41, by means of the coupling head "brake" 43, then there is no negative effect on the combination cylinder owing to the function of the shuttle valve 29. There are no additional forces from the spring-loaded brake member and the service brake member, since the service brake actuation takes the place of the aforementioned spring-loaded brake actuation. The service brake pressure becomes active by way of the shuttle valve 29 both in the spring-loaded brake member 33 and in the service brake member 35. In the spring-loaded brake member 33 the accumulator spring is released again, whereas in the service brake member the service brake diaphragm or a similar actuating member is pressurized.

The position of the release unit 1 also changes in relation to the position according to FIG. 3, since during coupling the release unit 1 is loaded with compressed air of the coupling head "supply" 13 and correspondingly the slider 7 is moved in the downward direction of the stop into the position, which is depicted in FIG. 5 and corresponds to the "drive position". Both in the uncoupled and in the coupled state of the trailer, it is possible to reduce the speed of the trailer.

In the coupled vehicle, the check valve 69, integrated into the piston 45, prevents automatic deceleration during a trip in the event of a pressure drop in the supply tank 65, since the spring-loaded brake member remains bled, thus remains released. The check valve 69 is provided in this sense as the pressure safety unit between the supply tank and the spring accumulator.

As explained above, the shuttle valve 29 prevents an overloading of the mechanical brake by means of the combination cylinder, since an overlapping of the forces of the spring-loaded brake member and the service brake member is ruled out.

Both the release unit 1 and the parking unit 3 can be provided with a force threshold in one or in all positions. In this respect it can be a spring-loaded catch element, which during actuation must be overcome. In the parking unit 3 a known blocking unit can also be provided in the park position.

The invention is not limited to the illustrated trailer brake system with a combined service brake and spring-loaded brake cylinder of the design, depicted in FIGS. 1 to 5. That is, the release unit, the parking unit, and the emergency brake unit can also be realized in trailer brake systems, in which the spring-loaded brake cylinder and the service brake cylinder are separated from each other, thus do not act on a common pressure rod. In this case there is no need for a shuttle valve. Similarly the invention is not limited to the application of an EBS module of the illustrated type. The advantages of the described combination release valve with integrated emergency brake function can be applied independently of the design of the valve, assigned to the brake cylinder or the combination cylinder.

Table of Reference Numerals 1 release unit
3 parking unit
5 emergency brake unit
7 slider
9 actuating button
11 line
13 coupling head "supply"
15 line
17 line
19 actuating button
21 slider
23 line
25 line
27 line
29 shuttle valve
31 line
33 spring-loaded brake member
35 service brake member
37 combined service brake and spring-loaded brake cylinder
39 EBS module
41 line
43 coupling head "brake"
45 piston
47 spring
49 inlet/outlet valve
51 valve body
53 valve seat
55 valve seat
57 outlet valve
59 inlet valve
61 attachment
63 pistons seal
65 supply tank
67 stop
69 check valve

What is claimed is:

1. Brake system for trailers, comprising:
a parking and maneuvering valve, which includes a release unit, a parking unit and an emergency brake unit, wherein a supply tank and a spring-loaded parking brake are attached to the parking and maneuvering valve,
supply and braking attachments, which are couplable to a towing vehicle brake system, wherein the supply attachment is connected to the release unit, and the brake attachment controls a service brake cylinder,
and a first actuating unit, which includes a first actuating member, assigned to the parking unit, wherein
a) the supply tank is attached to the emergency brake unit, and the emergency brake unit has an emergency brake valve, wherein to fill the supply tank, the supply attachment is connectable via the release unit and the emergency brake valve to the supply tank;
b) the spring-loaded parking brake is attached to the parking unit, and the parking unit is connected to the emergency brake unit;
c) a second actuating unit includes a second actuating member, assigned to the release unit; and wherein
d) as a function of the switching position of the release unit and the parking unit and as a function of the brake system of the trailer, the spring-loaded parking brake is uncoupled or coupled, pressurized or bled, in accordance with one of the drive, maneuvering or parking states.

2. Brake system, as claimed in claim 1 wherein:
a) the parking unit is attached by way of a line to the spring-loaded brake member of the spring-loaded parking brake;
b) the first actuating member of the parking unit comprises a first slider, which is provided with an actuating button outside the parking unit; and
c) spaced over an outer periphery of the first slider are sealing elements, which in accordance with a switching position of the first slider monitor the connection between the emergency brake unit and the spring-loaded brake member of the spring-loaded parking brake.

3. Brake system, as claimed in claim 1, wherein:
a) the emergency brake unit includes a spring-loaded piston, which is pressurized from the supply attachment via the release unit, when the supply and brake attachments are coupled, and is moveable into a first switching position against the spring tension under the influence of the supply pressure;
b) the supply tank of the trailer is fed in such a manner via a sealing element, which is located on the piston and acts as the check valve, that the supply tank is fillable with supply air when the release unit is attached to the supply attachment;
c) the emergency brake valve of the emergency brake unit bears an inlet/outlet valve, which monitors in such a manner the connection between the supply tank and the parking unit, controlling in accordance with the position of the first slider the connection to the spring-loaded parking brake, on the one hand, and on the other hand, the bleeding of the spring-loaded brake member that in the first switching position of the piston during pressurization of the same the inlet valve of the inlet/outlet valve is opened, whereas in the second switching position during subsequent uncoupling of the vehicle or line break due to a lack of pressurization of the piston, the bleeding connection of the spring-loaded brake member over the parking unit when the inlet valve is closed occurs via the opened outlet valve.

4. Brake system, as claimed in claim 1, wherein
the second actuating member of the release unit comprises a second slider; and
when the second slider is slid completely into the release unit and when the first slider is slid completely into the parking unit, a maneuver switching position is formed in such a manner that the spring-loaded braking member of the spring-loaded parking brake is pressurized and released over the opened inlet valve and the parking unit is pressurized with compressed air from the supply tank and released.

5. Brake system, as claimed in claim 2, wherein the second actuating member of the release unit comprises a second slider; and when the second slider is slid completely into the release unit and when the first slider is slid completely into the parking unit, a maneuver switching position is formed in such a manner that the spring-loaded braking member of the spring-loaded parking brake is pressurized and released over the opened inlet valve and the parking unit is pressurized with compressed air from the supply tank and released.

6. Brake system, as claimed in claim 3, wherein the second actuating member of the release unit comprises a second slider; and when the second slider is slid completely into the release unit and when the first slider is slid completely into the parking unit, a maneuver switching position is formed in such a manner that the spring-loaded braking member of the spring-loaded parking brake is pressurized and released over the opened inlet valve and the parking unit is pressurized with compressed air from the supply tank and released.

7. Brake system, as claimed in claim 4, wherein:

a) when coupling the brake system of the trailer, the second slider of the release unit is moveable, beginning from its maneuvering position, into a drive position via pressure pending at the supply attachment;

b) the switching position of the first slider, which belongs to the parking unit and is moved into the maneuvering position, remains unchanged in the drive position, whereby the spring-loaded brake member is pressurizeable with compressed air for purposes of releasing the brake; and c) when the first slider moves automatically into the drive position, the pressurization of the piston of the emergency brake unit that results by way of the supply tank in the maneuvering position, is taken over by the direct pressurization from the supply attachment.

8. Brake system, as claimed in claim 5, wherein:

a) when coupling the brake system of the trailer, the second slider of the release unit is moveable, beginning from its maneuvering position, into a drive position via pressure pending at the supply attachment;

b) the switching position of the first slider, which belongs to the parking unit and is moved into the maneuvering position, remains unchanged in the drive position, whereby the spring-loaded brake member is pressurizeable with compressed air for purposes of releasing the brake; and c) when the first slider moves automatically into the drive position, the pressurization of the piston of the emergency brake unit that results by way of the supply tank in the maneuvering position, is taken over by the direct pressurization from the supply attachment.

9. Brake system, as claimed in claim 6, wherein:

a) when coupling the brake system of the trailer, the second slider of the release unit is moveable, beginning from its maneuvering position, into a drive position via pressure pending at the supply attachment;

b) the switching position of the first slider, which belongs to the parking unit and is moved into the maneuvering position, remains unchanged in the drive position, whereby the spring-loaded brake member is pressurizeable with compressed air for purposes of releasing the brake; and c) when the first slider moves automatically into the drive position, the pressurization of the piston of the emergency brake unit that results by way of the supply tank in the maneuvering position, is taken over by the direct pressurization from the supply attachment.

10. Brake system, as claimed in claim 1, wherein the first and second actuating members comprise first and second sliders, respectively; and when the first slider is pulled out of the parking unit, the parking position of the trailer is switchable in such a manner in both the maneuver position in accordance with the retracted first slider and the drive position when the second slider of the release unit has been pulled out that the spring-loaded brake member is bleedable by way of the bleeding attachment of the emergency brake unit so that the parking position is possible in both the uncoupled and in the coupled state of the brake system.

11. Brake system, as claimed in claim 2, wherein the first and second actuating members comprise first and second sliders, respectively; and when the first slider is pulled out of the parking unit, the parking position of the trailer is switchable in such a manner in both the maneuver position in accordance with the retracted first slider and the drive position when the second slider of the release unit has been pulled out that the spring-loaded brake member is bleedable by way of the bleeding attachment of the emergency brake unit so that the parking position is possible in both the uncoupled and in the coupled state of the brake system.

12. Brake system, as claimed in claim 3, wherein the first and second actuating members comprise first and second sliders, respectively; and when the first slider is pulled out of the parking unit, the parking position of the trailer is switchable in such a manner in both the maneuver position in accordance with the retracted first slider and the drive position when the second slider of the release unit has been pulled out that the spring-loaded brake member is bleedable by way of the bleeding attachment of the emergency brake unit so that the parking position is possible in both the uncoupled and in the coupled state of the brake system.

13. Brake system, as claimed in claim 4, wherein when the first slider is pulled out of the parking unit, the parking position of the trailer is switchable in such a manner in both the maneuver position in accordance with the retracted first slider and the drive position when the second slider of the release unit has been pulled out that the spring-loaded brake member is bleedable by way of the bleeding attachment of the emergency brake unit so that the parking position is possible in both the uncoupled and in the coupled state of the brake system.

14. Brake system, as claimed in claim 7, wherein when the first slider is pulled out of the parking unit, the parking position of the trailer is switchable in such a manner in both the maneuver position in accordance with the retracted first slider and the drive position when the second slider of the release unit has been pulled out that the spring-loaded brake member is bleedable by way of the bleeding attachment of the emergency brake unit so that the parking position is possible in both the uncoupled and in the coupled state of the brake system.

15. Brake system, as claimed in claim 2, wherein there is a combined service brake cylinder and the spring-loaded parking brake, which is connected to a shuffle valve, which is attached, on the one hand, to the line, provided to pressurize and bleed, and also to a line, leading to the brake attachment, and which is provided for the purpose of preventing the spring-loaded parking brake and the service brake cylinder from having an additional braking pressure.

16. Braking system, as claimed in claim 1, wherein a check valve, which acts as a pressure safety unit for the spring-loaded parking brake, is located between the supply tank and the inlet/outlet valve and opens in the direction of the same.

17. Brake system, as claimed in claim 1, wherein the combined service brake cylinder and spring-loaded parking brake cylinder is controlled via an EBS module when the brake attachment is coupled; and wherein the EBS module is fed via the supply tank.

18. Brake system, as claimed in claim 1, wherein the release unit and the parking unit are structurally integrated with the emergency brake unit.

* * * * *